Oct. 8, 1929.  W. H. WALLACE  1,730,700

VEHICLE SPRING

Filed March 18, 1927

Inventor
William H. Wallace.
Kurs Hudson & Kent.
Attys.

Patented Oct. 8, 1929

1,730,700

UNITED STATES PATENT OFFICE

WILLIAM H. WALLACE, OF DETROIT, MICHIGAN

VEHICLE SPRING

Application filed March 18, 1927. Serial No. 176,341.

This invention relates to multiple-leaf vehicle springs and has for its object the provision of a spring made up of leaves of novel cross-section whereby the desired characteristics may be obtained with less material than when ordinary leaves, of substantially rectangular cross-section, are employed. This object is attained by a leaf cross-section in which the maximum amount of material is located relatively remote from the neutral axis of the cross-section so that the moment of inertia of the cross-section will be much greater than the moment of inertia of a flat leaf with the same area of cross-section and the metal fibers will not be subjected to stresses in excess of the elastic limit of the metal, within the allowable limit of deflection of the spring leaves.

Other objects of the invention and the features of novelty will be apparent from the following description, taken in connection with the accompanying drawings, of which:

Figure 1:
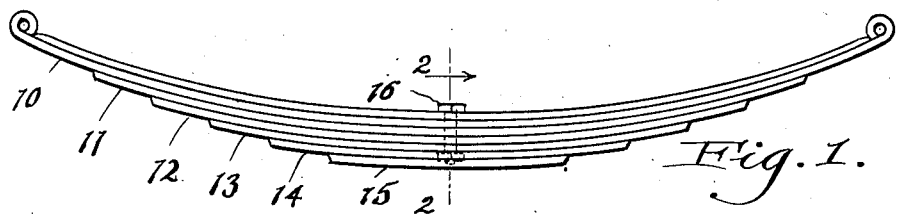
Fig. 1 is a side elevation of a multiple-leaf spring embodying my invention.

Referring to the drawings, the main leaf of the spring is indicated at 10 and this leaf is backed up by the usual reinforcing leaves 11, 12, 13, 14 and 15 which, according to the usual practice, are secured together by the center bolt 16.

According to the usual method of constructing leaf springs, each leaf is formed from a bar of substantially rectangular cross-section, commonly referred to as a flat bar. As is well known, the load-carrying capacity of a leaf is a function of the moment of inertia of the cross-section of the leaf and, in Fig. 3, I have illustrated a theoretical cross-section formed of the rectangular area, indicated by the numerals 17, 18, 19 and 20, and the two rectangular areas indicated by the numerals 21, 22, 23, and 24 and the numerals 25, 26, 27 and 28. The moment of inertia of the combined shaded rectangular areas of Fig. 3 is that of a rectangle of the same area as the combined shaded areas and of the same height, viz, represented by the line 23, 30.

Figure 3:
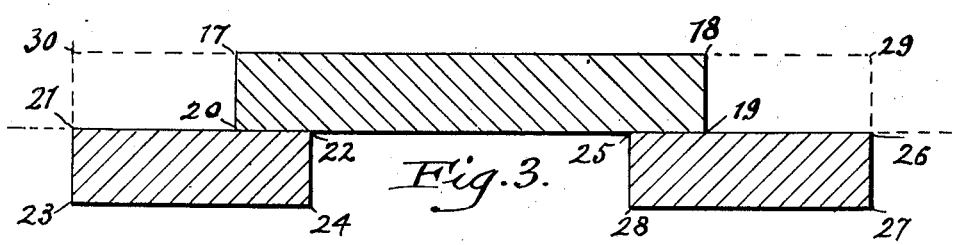
Fig. 3 is a diagram of a theoretical leaf cross-section, illustrating the principles of my invention.

Since the depth of the section represented by the shaded areas of Fig. 3 is double the thickness of each of the shaded areas, it is apparent that the moment of inertia of these combined shaded areas, being a function of the cube of the depth of the section, is four times that of a rectangular section of a depth equal to the depth between the points 21 and 23 and having the same area as that of the combined shaded areas. On account of the symmetrical arrangement of the shaded areas of Fig. 3 above the line 21, 26, the neutral axis of the section represented by the shaded areas is this line 21, 26.

Figure 4:
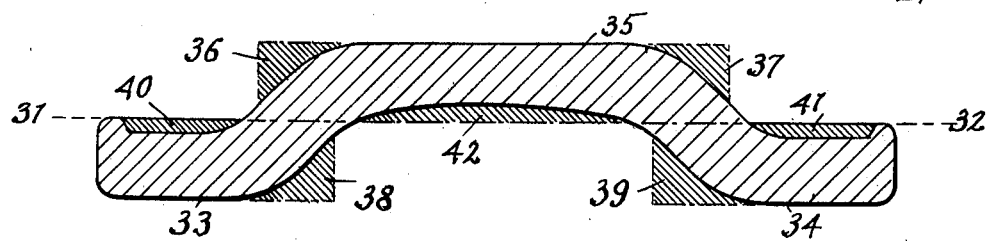
Fig. 4 is an enlarged cross-section of a leaf embodying my invention.

Referring now to Fig. 4, the shaded area represents my improved cross-section wherein the neutral axis is indicated by the line 31, 32, the portion of the shaded area above this line being substantially equal to that below it and the surfaces 33 and 34 being the same distance from the neutral axis as the surface 35. The triangular areas 36 and 37 are offset by the corresponding areas 38 and 39 on the opposite side of the neutral axis so that these areas do not change the neutral axis. The shaded areas 40 and 41 are, together, substantially equal to the shaded area 42 and, on account of these areas being located adjacent the neutral axis, while representing a material saving in metal, do not reduce the moment of inertia of the section a corresponding amount.

Figure 2:
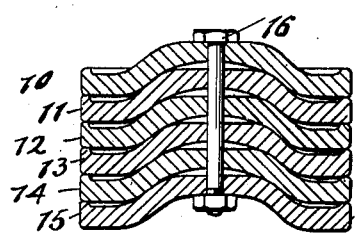
Fig. 2 is an enlarged transverse section thereof on the line 2—2 of Fig. 1.

From Fig. 2, it will be seen that there is a longitudinal groove at the middle of the lower surface of each leaf and other longitudinal grooves adjacent the edge portions on the upper surfaces of the leaves and these grooves are of advantage in providing lubricant spaces in addition to effecting the saving of metal without imparting the load-carrying characteristics of the leaf.

Having thus described my invention, what I claim is:

1. A multiple-leaf spring comprising leaves of arched cross-section, the convex side of which has symmetrically arranged grooves adjacent the edges of the section and the neutral axis of the section being located substantially at the middle of the height of the section.

2. A multiple-leaf spring comprising leaves having a central longitudinal groove on one side and longitudinal grooves in the opposite side symmetrically arranged adjacent the opposite longitudinal edges of the leaf and the neutral axis of the transverse cross-section of the leaves being located substantially at the middle of the height of the section.

3. A multiple-leaf spring comprising leaves having a central longitudinal groove on one side and longitudinal grooves in the opposite side symmetrically arranged adjacent the opposite longitudinal edges of the leaf and the neutral axis of the transverse cross-section of the leaves being located substantially at the middle of the height of the section, and the bottom portion of said central groove being located on the opposite side of said neutral axis from the second mentioned grooves.

In testimony whereof, I hereunto affix my signature.

WILLIAM H. WALLACE.